Aug. 6, 1935.  T. N. GARSON  2,010,146
SHOE TREE WITH ADJUSTABLE SHOE VAMP MODIFYING ATTACHMENT
Original Filed Aug. 11, 1931
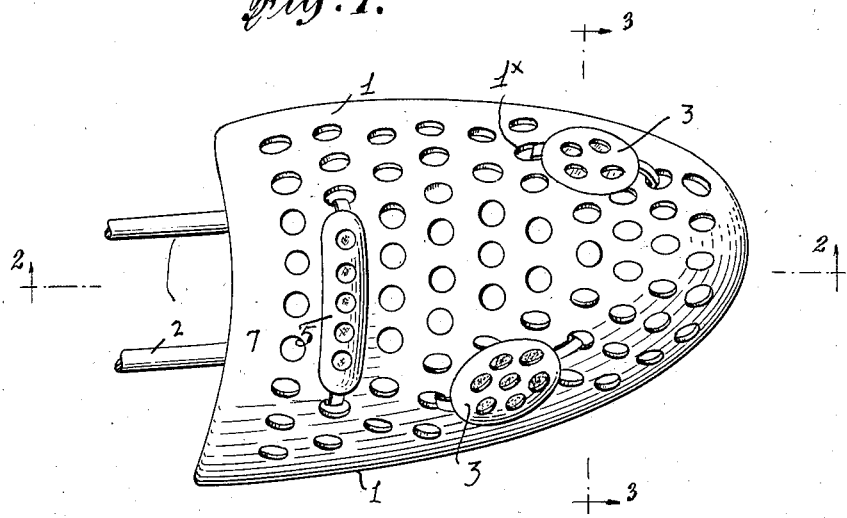
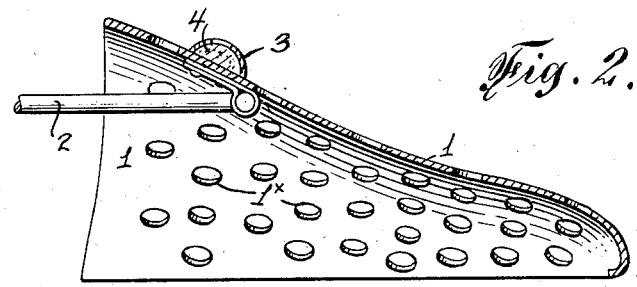
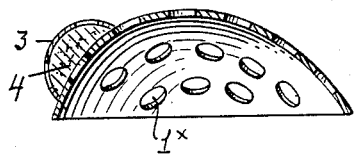
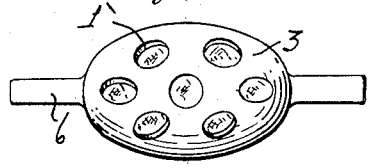
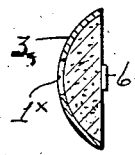
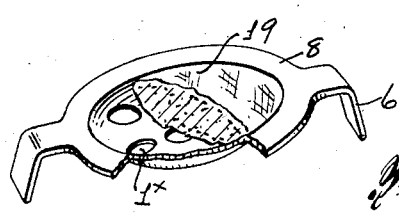
INVENTOR
Thomas N. Garson
BY
ATTORNEY Patented Aug. 6, 1935

2,010,146

UNITED STATES PATENT OFFICE 2,010,146

SHOE TREE WITH ADJUSTABLE SHOE-VAMP MODIFYING ATTACHMENT

Thomas N. Garson, Staten Island, N. Y.

Application August 11, 1931, Serial No. 556,382
Renewed December 29, 1934

2 Claims. (Cl. 12—128)

The object of the present invention is to provide a shoe tree adapted to hold in any one of a plurality of positions an attachment for modifying a section or sections of the shoe-vamp to accommodate foot deformities or abnormal conditions.

The characteristics of the invention is that the attachments are so designed as to hold moisture pads and to permit the passage of the moisture upward into contacts with the usual canvas lining to the leather itself so as to first moisten and shape the desired section of the shoe and then maintain the shape until the canvas and leather are set.

The invention will be described with reference to the accompanying drawing in which Figure 1 is a plan view of an embodiment of the invention showing a plurality of vamp-modifying attachments and in dotted lines a change in the position of each of the attachments.

Figure 2 is a longitudinal section on the line 2—2, Fig. 1.

Figure 3 is a transverse section on the line 3—3, Fig. 1.

Figures 4 and 5 are respectively plan and transverse sectional views of the vamp modifying attachment.

Figure 6 is a perspective view, partly broken away, of a third form of attachment.

Referring to the drawing, I have shown at 1, a metallic front portion of a shoe tree adapted to be secured to the rear or heel portion of the tree by the rods 2, or by any other suitable connecting members.

The tree is formed with a plurality of apertures 1x to receive one or more vamp-modifying attachments. Each attachment comprises a curved body provided at its lower face with a channel or pocket to receive an absorbent material.

In Figure 2, one of the attachments are shown at 3, the absorbent material being indicated at 4.

In Figures 4 and 5, the attachment is shown as having prongs 6, the upper portion thereof being provided with a plurality of apertures at 7 for the passage of moisture. The prongs 6 are adapted to enter two of the plurality of apertures formed in the tree and the attachments may be made of sheet metal enabling the prongs to be bent back upon the inner wall of the tree to hold the attachment in position. The attachment is adapted to raise a desired area of the shoe, as, for example, an area near the base of the arch where the upper and vamp are customarily seamed together. Thus, if the shoe at such seam presses upon the foot, the attachment illustrated in Figure 4 containing moistened absorbent material may be connected to the tree and the tree placed in the shoe. The attachment will modify the contour of the shoe, in accordance with the contour of the attachment and the moisture held by the absorbent material will assist in permanently setting the modified contour.

The attachments may be designed so that a plurality of them will effect all of the usual changes required in contour in order to adapt the shoe for common foot enlargements and minor abnormalities. In this respect the device will enable the use of stock shoes in many cases where, without the device, they could not be used.

In the attachment shown in Fig. 6, the member 8 is cupped to receive the moisture pad 9 and the moisture pad preferably extends slightly above the surface of the member 8 so as to initially engage the shoe vamp, pressure upon the pad 9 causing the moisture to readily pass to the lining canvas and thence to the leather in the area modified by the attachment.

It will be understood that the form of the attachment and means for securing it to various parts of the tree may be modified without departing from the spirit of the invention. What I claim and desire to secure by Letters Patent is as follows:—

1. In combination with a shoe tree, of a shoe contour modifying attachment comprising a substantially rigid rounded supporting member formed with an exterior seat, and a moisture receiving element supported on the surface of said seat and adapted for contact with the undersurface of a shoe.

2. In combination with a shoe tree, of a shoe contour modifying attachment comprising a substantially rigid rounded supporting member formed with a seat, and a moisture-receiving element on said seat and adapted to directly transfer moisture to that area of the undersurface of a shoe with which it lies in register.

THOMAS N. GARSON.